US011567668B1

(12) United States Patent
McPadden et al.

(10) Patent No.: US 11,567,668 B1
(45) Date of Patent: Jan. 31, 2023

(54) DATA FLOW MANAGEMENT IN A HETEROGENEOUS MEMORY DEVICE USING A THERMAL PROFILE

(71) Applicant: International Business Machines Corporation, Armonk, NY (US)

(72) Inventors: Adam J. McPadden, Underhill, VT (US); Janani Swaminathan, Bangalore (IN); Trinadhachari Kosuru, Bangalore (IN); Anil Bindu Lingambudi, Bangalore (IN); Sharath Manjunath, Mysore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/468,843

(22) Filed: Sep. 8, 2021

(51) Int. Cl.
*G06F 3/06* (2006.01)
*G06F 11/30* (2006.01)

(52) U.S. Cl.
CPC .......... *G06F 3/0613* (2013.01); *G06F 3/0635* (2013.01); *G06F 3/0653* (2013.01); *G06F 3/0679* (2013.01); *G06F 3/0685* (2013.01); *G06F 11/3058* (2013.01)

(58) Field of Classification Search
CPC .... G06F 3/0613; G06F 3/0635; G06F 3/0653; G06F 3/0679; G06F 3/0685; G06F 11/3058
See application file for complete search history.

(56) References Cited

U.S. PATENT DOCUMENTS

| 9,053,036 | B2 | 6/2015 | Jain | |
|---|---|---|---|---|
| 9,405,356 | B1* | 8/2016 | Sareen | G06F 3/0674 |
| 9,665,495 | B2 | 5/2017 | Maheshwari | |
| 10,013,194 | B1 | 7/2018 | Yang | |
| 10,387,078 | B1 | 8/2019 | Benisty | |
| 2006/0206681 | A1* | 9/2006 | Suzuki | G11B 27/329 |
| | | | | 711/170 |
| 2016/0117105 | A1 | 4/2016 | Thangaraj | |
| 2018/0088639 | A1 | 3/2018 | Remis | |

(Continued)

OTHER PUBLICATIONS

Khurshid, Mushfique. Thermal Management of the Hybrid Memory Cube. Diss. 2013. (Year: 2013).*

(Continued)

*Primary Examiner* — Nicholas J Simonetti
(74) *Attorney, Agent, or Firm* — Edward P. Li (57) ABSTRACT

A computer-implemented method, a computer program product, and a computer system for data flow management in a heterogeneous memory device. A media controller redirects traffic from first non-volatile memory (NVM) to second NVM, in response to an instantaneous temperature of the first NVM reaches a first predetermined temperature at which redirecting the traffic is started. The media controller throttles to reduce the traffic to the second NVM, in response to determining that the instantaneous temperature is higher than a second predetermined temperature at which throttling is started. The media controller redirects the traffic back to the first NVM, in response to determining that the instantaneous temperature is not higher than the second predetermined temperature and lower than a third predetermined temperature at which throttling is ended. The first NVM is thermally sensitive, while the second NVM is thermally tolerant.

20 Claims, 4 Drawing Sheets

(56) References Cited

U.S. PATENT DOCUMENTS

2018/0121131 A1   5/2018  Vogan
2018/0158492 A1*  6/2018  Lee ........................ G11C 7/04
2018/0284857 A1   10/2018 Yang
2018/0349046 A1   12/2018 Yang
2019/0317672 A1   10/2019 Linnen

OTHER PUBLICATIONS

Jia, Zhiping, et al. "Temperature-aware data allocation for embedded systems with cache and scratchpad memory." ACM Transactions on Embedded Computing Systems (TECS) 14.2 (2015): 1-24. (Year: 2015).*

Shang, Li, et al. "Temperature-aware on-chip networks." IEEE Micro 26.1 (2006): 130-139. (Year: 2006).*

Zhou, Minxuan, et al. "Temperature-aware dram cache management-relaxing thermal constraints in 3-d systems." IEEE Transactions on Computer-Aided Design of Integrated Circuits and Systems 39.10 (2019): 1973-1986. (Year: 2019).*

* cited by examiner

FIG. 1

$T_{throttleStart}$ – Temperature when the media controller is to start throttling $T_{redirectStart}$ – Temperature when the media controller is to redirect traffic from first NVM to second NVM $T_{throttleEnd}$ – Temperature when the media controller is to end throttling

DATA FLOW MANAGEMENT IN A HETEROGENEOUS MEMORY DEVICE USING A THERMAL PROFILE

BACKGROUND

The present invention relates generally to a heterogeneous memory device, and more particularly to data flow management in a heterogeneous memory device using a thermal profile.

Data flow management in a memory subsystem is complicated, as the speeds increase and complementary metal—oxide—semiconductor (CMOS) devices shrink in size. Especially, data flow management in a heterogenous memory subsystem is very tricky, when the device operation depends on a system thermal profile. A one-controller-fits-all approach is not possible when there is a mix of volatile memory and non-volatile memory in the same area, especially when bandwidth and throughput requirements are different. Going forward, there will be a heterogenous mix of technologies and devices coming together to bridge differences and bring in efficiency and performance improvements, both at a subsystem level and a system level.

SUMMARY

In one aspect, a computer-implemented method for data flow management in a heterogeneous memory device is provided. The method includes redirecting, by a media controller in the heterogeneous memory device, traffic from first non-volatile memory in the heterogeneous memory device to second non-volatile memory in the heterogeneous memory device, in response to determining that an instantaneous temperature of the first non-volatile memory reaches a first predetermined temperature at which redirecting the traffic is started. The first non-volatile memory is thermally sensitive, while the second non-volatile memory is thermally tolerant. The method further includes throttling, by the media controller, to reduce the traffic to the second non-volatile memory, in response to determining that the instantaneous temperature is higher than a second predetermined temperature at which throttling is started. The method further includes redirecting, by the media controller, the traffic back to the first non-volatile memory, in response to determining that the instantaneous temperature is not higher than the second predetermined temperature and the instantaneous temperature is lower than a third predetermined temperature at which throttling is ended.

In another aspect, a computer program product for data flow management in a heterogeneous memory device is provided. The computer program product comprises a computer readable storage medium having program instructions embodied therewith, and the program instructions are executable by one or more processors. The program instructions are executable to: redirect, by a media controller in the heterogeneous memory device, traffic from first non-volatile memory in the heterogeneous memory device to second non-volatile memory in the heterogeneous memory device, in response to determining that an instantaneous temperature of the first non-volatile memory reaches a first predetermined temperature at which redirecting the traffic is started, wherein the first non-volatile memory is thermally sensitive, wherein the second non-volatile memory is thermally tolerant; throttle, by the media controller, to reduce the traffic to the second non-volatile memory, in response to determining that the instantaneous temperature is higher than a second predetermined temperature at which throttling is started; redirect, by the media controller, the traffic back to the first non-volatile memory, in response to determining that the instantaneous temperature is not higher than the second predetermined temperature and the instantaneous temperature is lower than a third predetermined temperature at which throttling is ended.

In yet another aspect, a computer system for data flow management in a heterogeneous memory device is provided. The computer system comprises one or more processors, one or more computer readable tangible storage devices, and program instructions stored on at least one of the one or more computer readable tangible storage devices for execution by at least one of the one or more processors. The program instructions are executable to redirect, by a media controller in the heterogeneous memory device, traffic from first non-volatile memory in the heterogeneous memory device to second non-volatile memory in the heterogeneous memory device, in response to determining that an instantaneous temperature of the first non-volatile memory reaches a first predetermined temperature at which redirecting the traffic is started, wherein the first non-volatile memory is thermally sensitive, wherein the second non-volatile memory is thermally tolerant. The program instructions are further executable to throttle, by the media controller, to reduce the traffic to the second non-volatile memory, in response to determining that the instantaneous temperature is higher than a second predetermined temperature at which throttling is started. The program instructions are further executable to redirect, by the media controller, the traffic back to the first non-volatile memory, in response to determining that the instantaneous temperature is not higher than the second predetermined temperature and the instantaneous temperature is lower than a third predetermined temperature at which throttling is ended.

DETAILED DESCRIPTION

Figure 1:
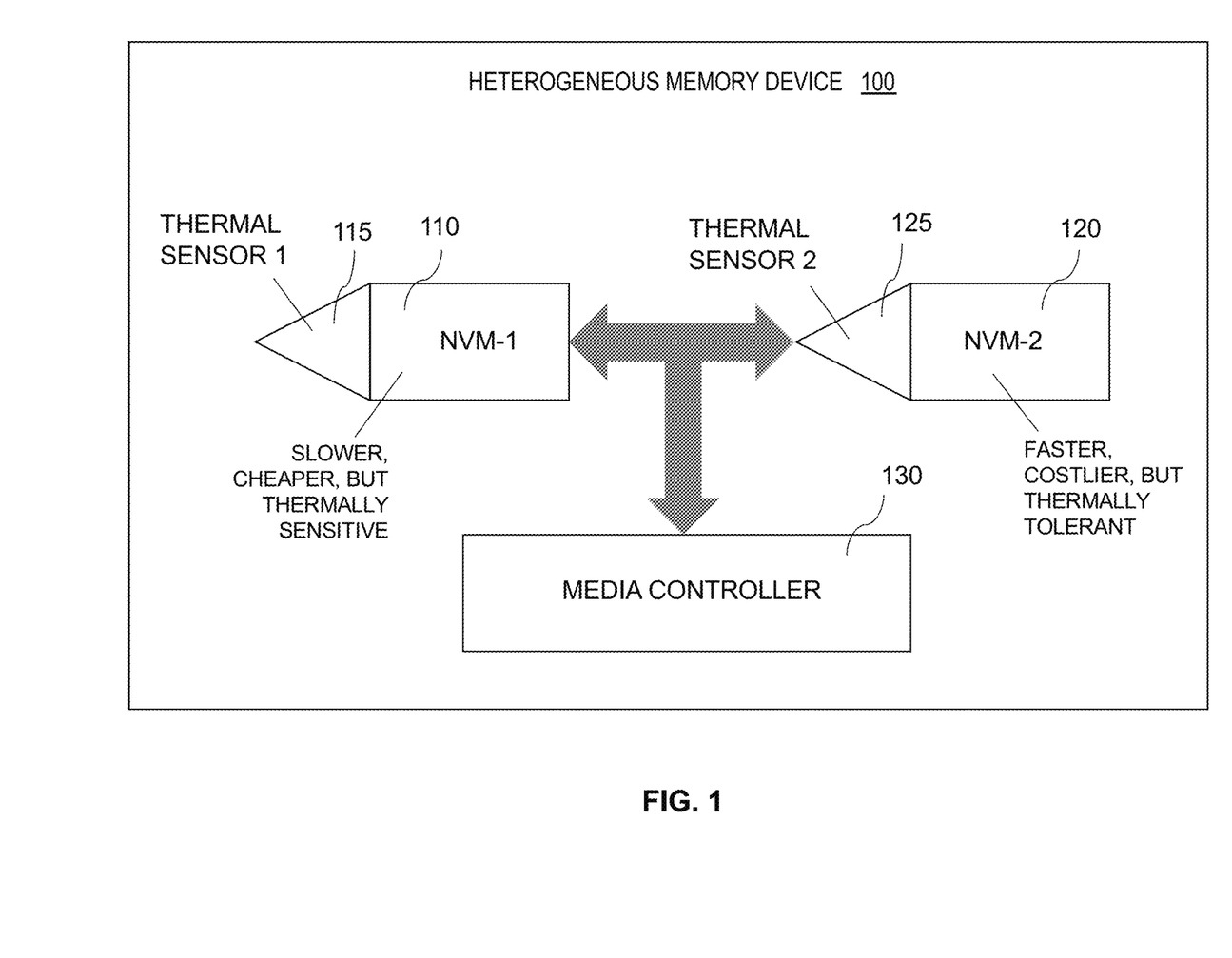
FIG. 1 is a systematic diagram illustrating a heterogeneous memory device, in accordance with one embodiment of the present invention.

The present invention discloses a heterogenous storage class memory (SCM) solution. FIG. 1 is a systematic diagram illustrating a heterogeneous memory device, in accordance with one embodiment of the present invention. As shown in FIG. 1, heterogeneous memory device 100 includes first non-volatile memory (NVM-1 110), which is slower, cheap, but thermally sensitive; heterogeneous memory device 100 further includes second non-volatile memory (NVM-2 120), which is a faster, costly (e.g., several times cost of the first non-volatile memory), but thermally tolerant. The second non-volatile memory (NVM-2 120) works as a backup cache to prevent performance hit due to thermal throttling. The size of the second non-volatile memory (NVM-2 120) is determined by considering the time it takes for the first non-volatile memory (NVM-1 110) to cool down at a worst case scenario and the amount of data to be supported by the second non-volatile memory (NVM-2 120) during that time.

The first non-volatile memory (NVM-1 110) has a first on-chip thermal sensor (thermal sensor 1 115) and the second non-volatile memory (NVM-2 120) has a second on-chip thermal sensor (thermal sensor 2 125).

Heterogeneous memory device 100 has a media controller (media controller 130). The media controller (media controller 130) monitors temperatures on the first non-volatile memory (NVM-1 110) and the second non-volatile memory (NVM-2 120), using the first on-chip thermal sensor (thermal sensor 1 115) and the second on-chip thermal sensor (thermal sensor 2 125). The media controller (media controller 130) manages data flow of the first non-volatile memory (NVM-1 110) and the second non-volatile memory (NVM-2 120), using a thermal profile. The media controller (media controller 130) has a bidirectional data bus (for reads and writes).

Primarily, traffic is directed to the first non-volatile memory (NVM-1 110). As more traffic comes in and there is more activities on the first non-volatile memory (NVM-1 110), the temperature of the first non-volatile memory (NVM-1 110) tends to increase. The rate of the increase is dependant on the kind of workload exercising the first non-volatile memory (NVM-1 110).

Using the first on-chip thermal sensor (thermal sensor 1 115) on the first non-volatile memory (NVM-1 110) and the second on-chip thermal sensor (thermal sensor 2 125) on the second non-volatile memory (NVM-2 120), the media controller (media controller 130) can track the rate of the increase and predict whether the first non-volatile memory (NVM-1 110) is going to hit a performance bottleneck by approaching the throttle temperature. The thermal throttle temperatures of the non-volatile memory are assumed to be different and technology dependant. When the first non-volatile memory (NVM-1 110) hits the throttle temperature, some of the traffic is redirected to the temperature tolerant and fast second non-volatile memory (NVM-2 120), in order to reduce the burden on the slower first non-volatile memory (NVM-1 110). The bandwidth of the second non-volatile memory (NVM-2 120) is capped at the maximum guaranteed bandwidth of the first non-volatile memory (NVM-1 110), in order to ensure performance variation is not observed. Once the first non-volatile memory (NVM-1 110) starts cooling down, the media controller (media controller 130) redirects the traffic back to the first non-volatile memory (NVM-1 110) with the data in the second non-volatile memory (NVM-2 120) being slowly moved over to the first non-volatile memory (NVM-1 110).

The media controller (media controller 130) maintains the address table for both the first non-volatile memory (NVM-1 110) and the second non-volatile memory (NVM-2 120), with the address range split between the first non-volatile memory (NVM-1 110) and the second non-volatile memory (NVM-2 120). This helps the media controller (media controller 130) redirect requests appropriately.

The present invention proposes an SCM model that has two types of non-volatile memory; the size of the second non-volatile memory (NVM-2 120) satisfies the data traffic requirement when the first non-volatile memory (NVM-1 110) cools down. With this solution, the media controller (media controller 130) potentially reduces the possibility of thermal incidents by using a different storage media, instead of hitting a performance bottleneck due to thermal issues.

Figure 2:
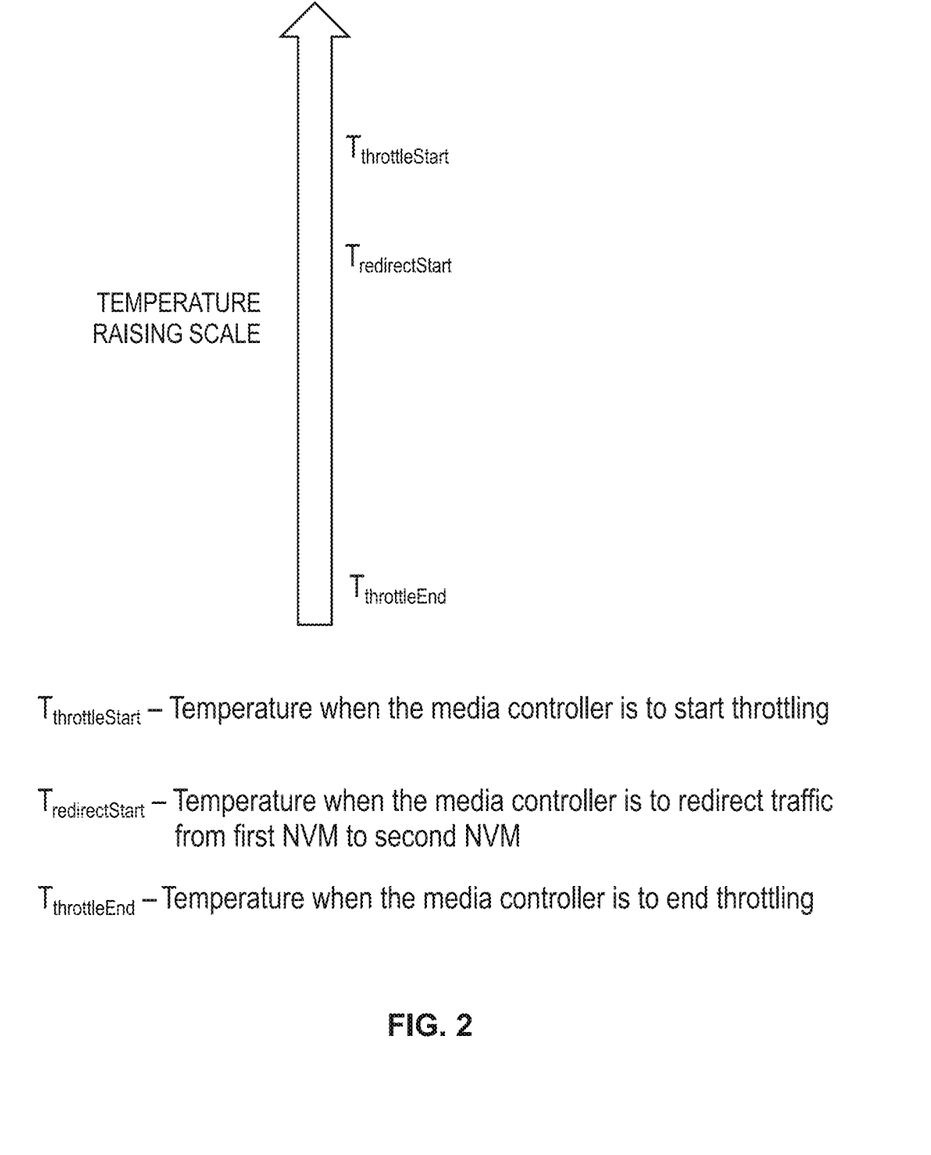
FIG. 2 illustrates a temperature raising scale of non-volatile memory in a heterogeneous memory device, in accordance with one embodiment of the present invention.

FIG. 2 illustrates a temperature raising scale of non-volatile memory (such as the first non-volatile memory (NVM-1 110) shown in FIG. 1) in a heterogeneous memory device (such as heterogeneous memory device 100 shown in FIG. 1), in accordance with one embodiment of the present invention. In a thermal profile used in the present invention, three temperatures are considered, including, $T_{throttleStart}$, $T_{redirectStart}$, and $T_{throttleEnd}$. $T_{throttleStart}$ is the temperature at which the media controller (media controller 130) starts throttling. $T_{redirectStart}$ is the temperature of the first non-volatile memory (NVM-1 110) when the media controller (media controller 130) starts to redirect the traffic from the first non-volatile memory (NVM-1 110) to the second non-volatile memory (NVM-2 120). $T_{throttleEnd}$ is the temperature at which the media controller (media controller 130) starts throttling. $T_{throttleStart}$, $T_{redirectStart}$, and $T_{throttleEnd}$ are predetermined based on device characterization data.

In response to that an instantaneous temperature of the first non-volatile memory (NVM-1 110) reaches the predetermined value of $T_{redirectStart}$, the media controller (media controller 130) redirects the traffic from the first non-volatile memory (NVM-1 110) to the second non-volatile memory (NVM-2 120). If the instantaneous temperature of the first non-volatile memory (NVM-1 110) keeps increasing even though the media controller (media controller 130) redirects the traffic, the instantaneous temperature hits the predetermined value of $T_{throttleStart}$, the media controller (media controller 130) starts throttling; whereby the traffic to the second non-volatile memory (NVM-2 120) is reduced to allow the first non-volatile memory (NVM-1 110) more time to cool down. Once the instantaneous temperature of the first non-volatile memory (NVM-1 110) goes down to the predetermined value of $T_{throttleEnd}$, the media controller (media controller 130) starts to redirect the traffic back to the first non-volatile memory (NVM-1 110).

Figure 3:
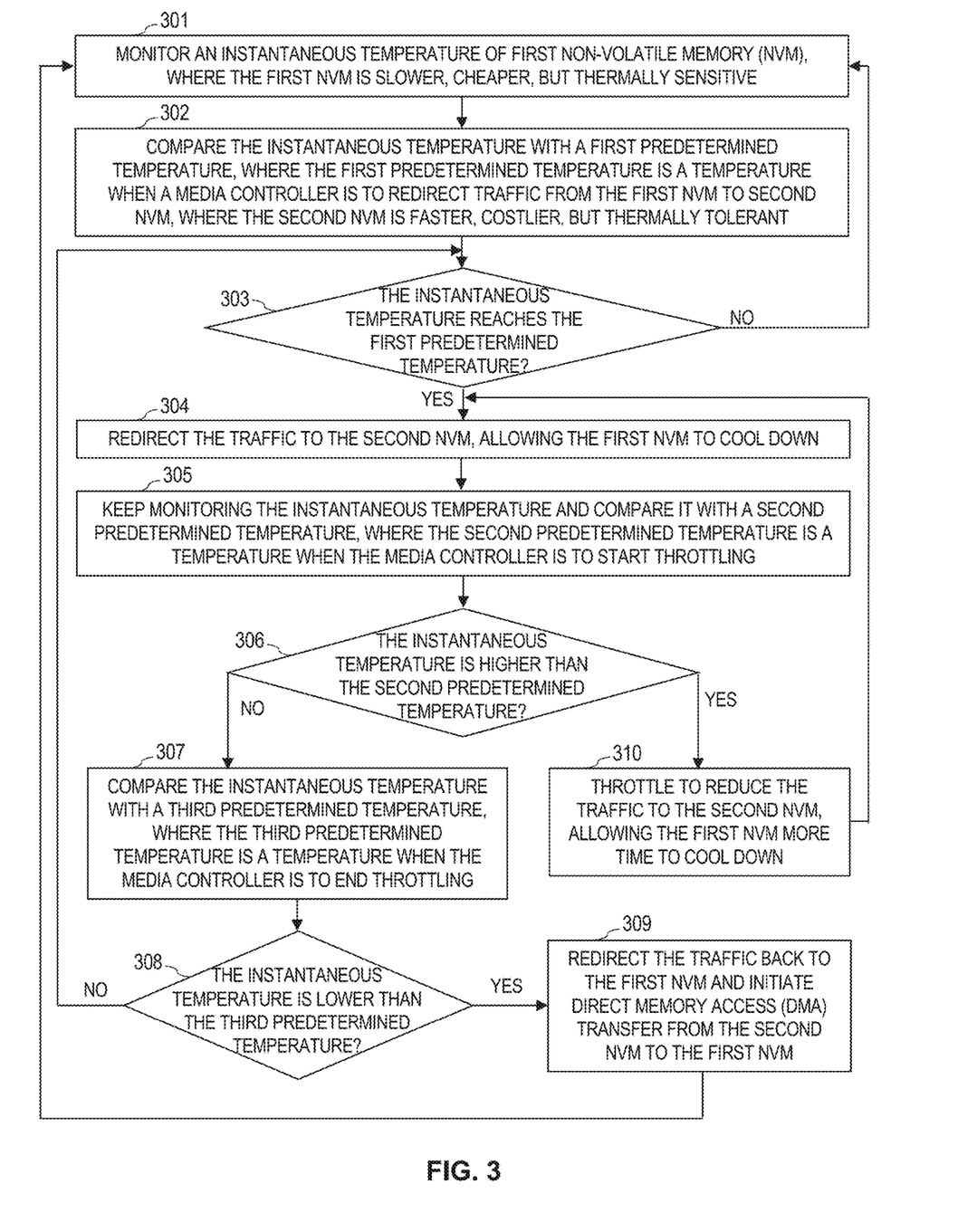
FIG. 3 is a flowchart of data flow management on a heterogeneous memory device using a thermal profile, in accordance with one embodiment of the present invention.

FIG. 3 is a flowchart of data flow management on a heterogeneous memory device using a thermal profile, in accordance with one embodiment of the present invention. At step 301, a media controller (such as media controller 130 shown in FIG. 1) in a heterogeneous memory device (such as heterogeneous memory device 100 shown in FIG. 1) monitors an instantaneous temperature of first non-volatile memory (such as NVM-1 110 shown in FIG. 1). The first non-volatile memory is slower, cheaper, but thermally sensitive.

At step 302, the media controller compares the instantaneous temperature with a first predetermined temperature, where the first predetermined temperature is a temperature when a media controller is to redirect traffic from the first non-volatile memory to second non-volatile memory (such as NVM-2 120 shown in FIG. 1). The first predetermined temperature is $T_{redirectStart}$ described a previous paragraph with reference to FIG. 2. Contrary to the first non-volatile memory, the second non-volatile memory is faster, costlier, but thermally tolerant.

At step 303, the media controller determines whether the instantaneous temperature reaches the first predetermined temperature ($T_{redirectStart}$). In response to determining that the instantaneous temperature does not reach the first predetermined temperature (NO branch of decision step 303), the media controller iterates step 301.

In response to determining that the instantaneous temperature reaches the first predetermined temperature (YES branch of decision step 303), at step 304, the media controller redirects the traffic to the second non-volatile memory, allowing the first non-volatile memory to cool down. The second non-volatile memory may have better performance than the first non-volatile memory. The bandwidth of the second non-volatile memory is capped at the maximum guaranteed bandwidth of the first non-volatile memory, so that no performance variation is observed when the traffic is redirected to the second non-volatile memory.

After the media controller redirects the traffic at step 304, the instantaneous temperature of the first non-volatile memory may keep increasing. Therefore, at step 305, the media controller keeps monitoring the instantaneous temperature and further compares the instantaneous temperature with a second predetermined temperature. The second predetermined temperature is a temperature when the media controller is to start throttling. The second predetermined temperature is $T_{throttleStart}$ described a previous paragraph with reference to FIG. 2.

At step 306, the media controller determines whether the instantaneous temperature is higher than the second predetermined temperature. In response to determining that the instantaneous temperature is not higher than the second predetermined temperature (NO branch of decision step 306), at step 307, the media controller compares the instantaneous temperature with a third predetermined temperature, where the third predetermined temperature is a temperature when the media controller is to end throttling.

At step 308, the media controller determines whether the instantaneous temperature is lower than the third predetermined temperature. In response to determining that the instantaneous temperature is not lower than the third predetermined temperature (NO branch of decision step 308), the media controller iterates step 303.

In response to determining that the instantaneous temperature is lower than the third predetermined temperature (YES branch of decision step 308), at step 309, the media controller redirects the traffic back to the first non-volatile memory and initiates direct memory access (DMA) transfer from the second non-volatile memory to the first non-volatile memory, with the granularity of writes being the same as the granularity of the first non-volatile memory. The address translation table is updated accordingly. After step 309, the traffic is directed to the first non-volatile memory; therefore, the media controller iterates step 301.

Referring back to decision step 306, in response to determining that the instantaneous temperature is higher than the second predetermined temperature (YES branch of decision step 306), at step 310, the media controller throttles to reduce the traffic to the second non-volatile memory, allowing the first non-volatile memory more time to cool down. Then, the media controller iterates step 304; the media controller continues to redirect the traffic to the second non-volatile memory.

Figure 4:
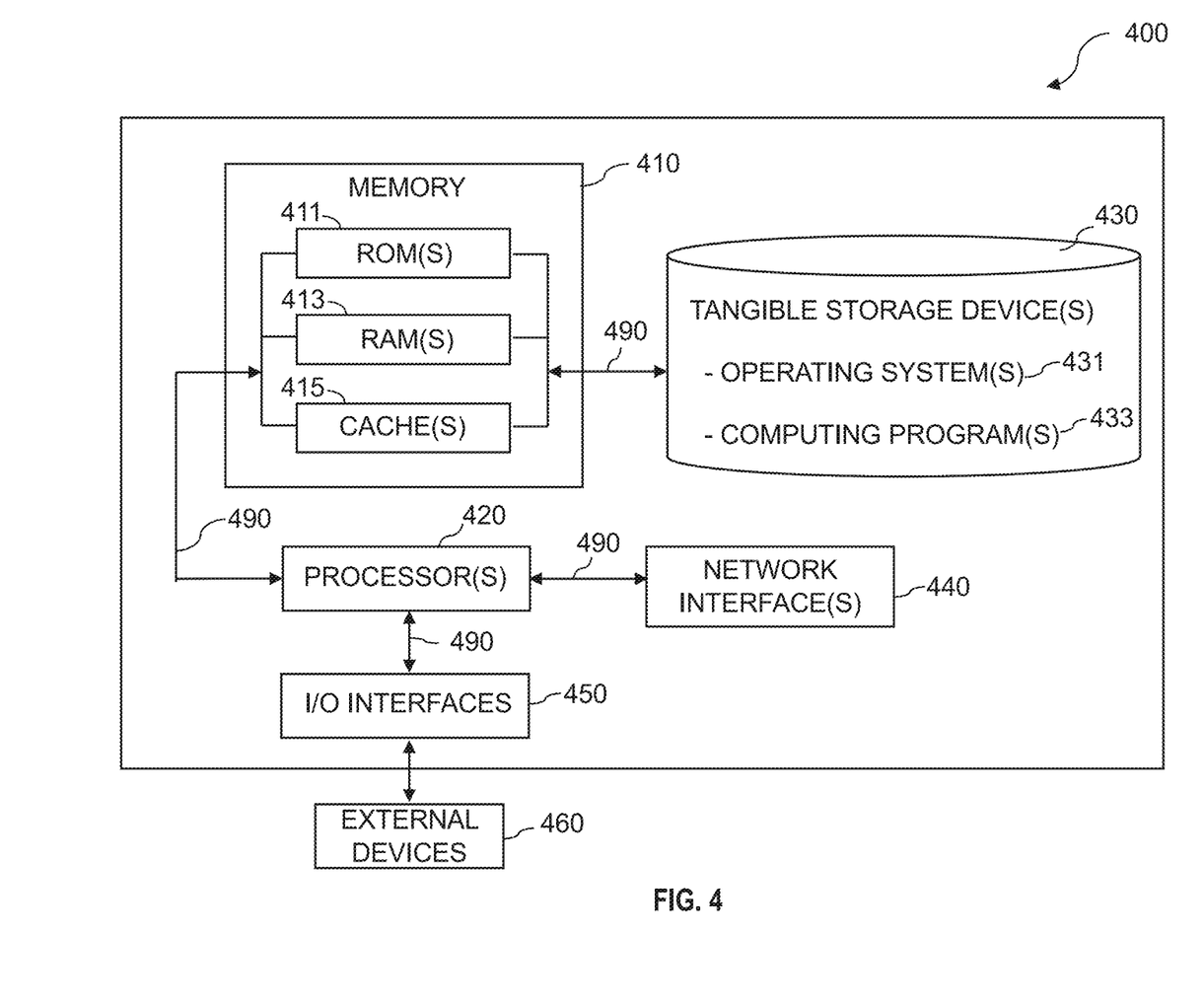
FIG. 4 is a diagram illustrating components of a computing device with heterogeneous memory, in accordance with one embodiment of the present invention.

FIG. 4 is a diagram illustrating components of computing device or server 400 with heterogeneous memory, in accordance with one embodiment of the present invention. It should be appreciated that FIG. 4 provides only an illustration of one implementation and does not imply any limitations with regard to the environment in which different embodiments may be implemented.

Referring to FIG. 4, computing device or server 400 includes processor(s) 420, memory 410, and tangible storage device(s) 430. In FIG. 4, communications among the above-mentioned components of computing device or server 400 are denoted by numeral 490. Memory 410 includes ROM(s) (Read Only Memory) 411, RAM(s) (Random Access Memory) 413, and cache(s) 415. One or more operating systems 431 and one or more computer programs 433 reside on one or more computer readable tangible storage device(s) 430.

Computing device or server 400 further includes I/O interface(s) 450. I/O interface(s) 450 allows for input and output of data with external device(s) 460 that may be connected to computing device or server 400. Computing device or server 400 further includes network interface(s) 440 for communications between computing device or server 400 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for data flow management in a heterogeneous memory device, the method comprising:
   in response to determining that an instantaneous temperature of first non-volatile memory in the heterogeneous memory device rises to a first predetermined temperature at which redirecting traffic is started, redirecting, by a media controller in the heterogeneous memory device, the traffic from the first non-volatile memory to second non-volatile memory in the heterogeneous memory device, wherein the first non-volatile memory is slower, inexpensive, and thermally sensitive, wherein the second non-volatile memory is faster, expensive, and thermally tolerant;
   in response to determining that the instantaneous temperature of the first non-volatile memory keeps rising after the traffic is redirected from the first non-volatile memory to the second non-volatile memory and rises to a second predetermined temperature at which throttling is started and which is higher than the first predetermined temperature, throttling the second non-volatile memory, by the media controller, to reduce the traffic to the second non-volatile memory and allow the first non-volatile memory more time to cool down;
   in response to determining that the instantaneous temperature of the first non-volatile memory lowers to a third predetermined temperature at which throttling is ended and which is lower than the first predetermined temperature, redirecting, by the media controller, the traffic back to the first non-volatile memory.

2. The computer-implemented method of claim 1, wherein the first non-volatile memory and the second non-volatile memory have respective on-chip thermal sensors.

3. The computer-implemented method of claim 1, further comprising:
   monitoring, by the media controller, the instantaneous temperature of the first non-volatile memory, using an on-chip thermal sensor on the first non-volatile memory.

4. The computer-implemented method of claim 1, further comprising:
   in response to determining that the instantaneous temperature of the first non-volatile memory does not rise to the first predetermined temperature, keeping monitoring, by the media controller, the instantaneous temperature while the traffic is directed to the first non-volatile memory.

5. The computer-implemented method of claim 1, further comprising:
   in response to determining that the instantaneous temperature of the first non-volatile memory lowers to the third predetermined temperature, initiating, by the media controller, direct memory access transfer from the second non-volatile memory to the first non-volatile memory.

6. The computer-implemented method of claim 1, further comprising:
   in response to determining the instantaneous temperature of the first non-volatile memory does not lower to the third predetermined temperature, keeping monitoring, by the media controller, the instantaneous temperature of the first non-volatile memory while the traffic is directed to the second non-volatile memory.

7. The computer-implemented method of claim 1, wherein a bandwidth of the second non-volatile memory is capped at a bandwidth of the first non-volatile memory, such that a performance variation is not observed while the traffic is redirected to the second non-volatile memory.

8. A computer program product for data flow management in a heterogeneous memory device, the computer program product comprising a computer readable storage medium having program instructions embodied therewith, the program instructions executable by one or more processors, the program instructions executable to:
   in response to determining that an instantaneous temperature of first non-volatile memory in the heterogeneous memory device rises to a first predetermined temperature at which redirecting traffic is started, redirect, by a media controller in the heterogeneous memory device, the traffic from the first non-volatile memory to second non-volatile memory in the heterogeneous memory device, wherein the first non-volatile memory is slower, inexpensive, and thermally sensitive, wherein the second non-volatile memory is faster, expensive, and thermally tolerant;
   in response to determining that the instantaneous temperature of the first non-volatile memory keeps rising after the traffic is redirected from the first non-volatile memory to the second non-volatile memory and rises to a second predetermined temperature at which throttling is started and which is higher than the first predetermined temperature, throttle the second non-volatile memory, by the media controller, to reduce the traffic to the second non-volatile memory and allow the first non-volatile memory more time to cool down;
   in response to determining that the instantaneous temperature of the first non-volatile memory lowers to is lower than a third predetermined temperature at which throttling is ended and which is lower than the first predetermined temperature, redirect, by the media controller, the traffic back to the first non-volatile memory.

9. The computer program product of claim 8, wherein the first non-volatile memory and the second non-volatile memory have respective on-chip thermal sensors.

10. The computer program product of claim 8, further comprising:
   monitor, by the media controller, the instantaneous temperature of the first non-volatile memory, using an on-chip thermal sensor on the first non-volatile memory.

11. The computer program product of claim 8, further comprising:
   in response to determining that the instantaneous temperature of the first non-volatile memory does not rise to the first predetermined temperature, keep monitoring, by the media controller, the instantaneous temperature while the traffic is directed to the first non-volatile memory.

12. The computer program product of claim 8, further comprising:
   in response to determining that the instantaneous temperature of the first non-volatile memory lowers to the third predetermined temperature, initiate, by the media controller, direct memory access transfer from the second non-volatile memory to the first non-volatile memory.

13. The computer program product of claim 8, further comprising:
   in response to determining the instantaneous temperature of the first non-volatile memory does not lower to the third predetermined temperature, keep monitoring, by the media controller, the instantaneous temperature of the first non-volatile memory while the traffic is directed to the second non-volatile memory.

14. The computer program product of claim 8, wherein a bandwidth of the second non-volatile memory is capped at a bandwidth of the first non-volatile memory, such that a performance variation is not observed while the traffic is redirected to the second non-volatile memory.

15. A computer system for data flow management in a heterogeneous memory device, the computer system comprising one or more processors, one or more computer readable tangible storage devices, and program instructions stored on at least one of the one or more computer readable tangible storage devices for execution by at least one of the one or more processors, the program instructions executable to:
   in response to determining that an instantaneous temperature of first non-volatile memory in the heterogeneous memory device rises to a first predetermined temperature at which redirecting traffic is started, redirect, by a media controller in the heterogeneous memory device, the traffic from the first non-volatile memory to second non-volatile memory in the heterogeneous memory device, wherein the first non-volatile memory is slower, inexpensive, and thermally sensitive, wherein the second non-volatile memory is faster, expensive, and thermally tolerant;
   in response to determining that the instantaneous temperature of the first non-volatile memory keeps rising after the traffic is redirected from the first non-volatile memory to the second non-volatile memory and rises to a second predetermined temperature at which throttling is started and which is higher than the first predetermined temperature, throttle the second non-volatile memory, by the media controller, to reduce the traffic to the second non-volatile memory and allow the first non-volatile memory more time to cool down;
   in response to determining that the instantaneous temperature of the first non-volatile memory lowers to a third predetermined temperature at which throttling is ended and which is lower than the first predetermined temperature, redirect, by the media controller, the traffic back to the first non-volatile memory.

16. The computer system of claim 15, wherein the first non-volatile memory and the second non-volatile memory have respective on-chip thermal sensors, wherein a bandwidth of the second non-volatile memory is capped at a bandwidth of the first non-volatile memory, such that a performance variation is not observed while the traffic is redirected to the second non-volatile memory.

17. The computer system of claim 15, further comprising:
   monitor, by the media controller, the instantaneous temperature of the first non-volatile memory, using an on-chip thermal sensor on the first non-volatile memory.

18. The computer system of claim 15, further comprising:
   in response to determining that the instantaneous temperature of the first non-volatile memory does not rise to the first predetermined temperature, keep monitoring, by the media controller, the instantaneous temperature while the traffic is directed to the first non-volatile memory.

19. The computer system of claim 15, further comprising:
   in response to determining that the instantaneous temperature of the first non-volatile memory lowers to the third predetermined temperature, initiate, by the media controller, direct memory access transfer from the second non-volatile memory to the first non-volatile memory.

20. The computer system of claim 15, further comprising:
in response to determining the instantaneous temperature of the first non-volatile memory does not lower to the third predetermined temperature, keep monitoring, by the media controller, the instantaneous temperature of the first non-volatile memory while the traffic is directed to the second non-volatile memory.

* * * * *